No. 707,578. Patented Aug. 26, 1902.
H. FUNK.
GRAIN DRILL SHOE.
(Application filed June 17, 1902.)
(No Model.)

Witnesses

Inventor
Henry Funk.
By R. S. & A. B. Lacey, Attorneys.

UNITED STATES PATENT OFFICE.

HENRY FUNK, OF PANA, ILLINOIS.

GRAIN-DRILL SHOE.

SPECIFICATION forming part of Letters Patent No. 707,578, dated August 26, 1902.

Application filed June 17, 1902. Serial No. 112,074. (No model.)

*To all whom it may concern:*

Be it known that I, HENRY FUNK, a citizen of the United States, residing at Pana, in the county of Christian and State of Illinois, have invented certain new and useful Improvements in Grain-Drill Shoes, of which the following is a specification.

This invention provides a shoe or furrow-opener for grain-drills and like seed-planting machines which will sow the grain deep, so as to obviate "winter-kill," and provide ridges between the rows, with the result that the seed will make strong root and a harvest be assured.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
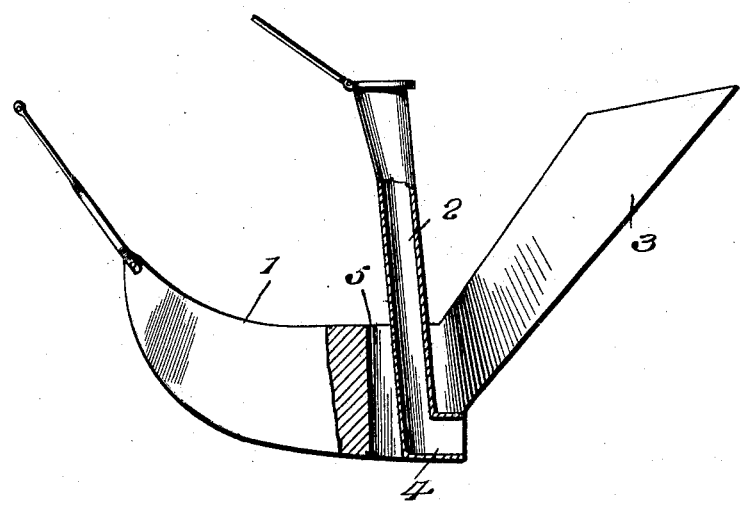
Figure 2:
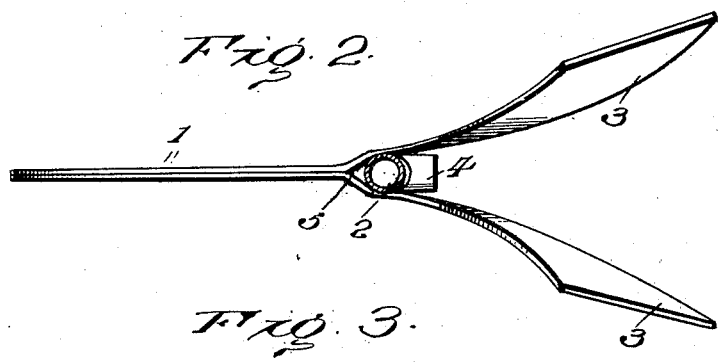
Figure 3:
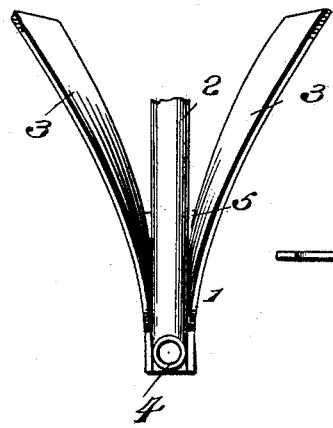
Figure 4:
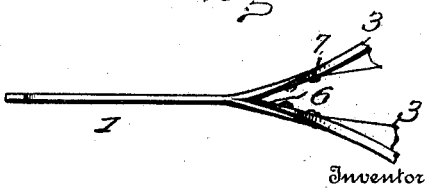

Figure 1 is a side elevation of a grain-drill, showing the application of the invention, a portion being broken away to show the tube or spout. Fig. 2 is a top plan view. Fig. 3 is a rear view. Fig. 4 is a top plan view showing a different construction of shoe.

Corresponding and like parts are referred to in the following description and indicated in all the views of the drawings by the same reference characters.

The shoe comprises a runner or furrow-opener 1, tube 2, and wings or moldboards 3. The runner is upwardly and forwardly curved in the accustomed manner, and its rear portion is spread so as to accommodate the lower end of the grain-tube 2, which is fitted therein. The grain-tube extends to the bottom portion of the runner and is provided at its lower end with an elbow 4, which points rearwardly to insure delivery of the grain into the furrow without clogging of the tube. The runner may be of any construction and, as shown, is preferably composed of two plates or parts placed together and having their rear portions diverged from the point 5, as shown most clearly in Fig. 2, to form the wings or moldboards 3, which incline upwardly and rearwardly and curve outwardly toward their upper ends and spring from the rear of the runner at a point above the elbow 4 or delivery end of the grain-tube 2. These wings or moldboards may be applied to the runner in any manner, but preferably consist of an integral part of the plates or members comprising the said runner. By having the wings or runners wholly above the delivery end of the grain-tube the seed is planted deep, so as not to winter-kill, and the wings or moldboards clear the furrow and form ridges between the rows, which is essential to the attainment of good results. By having the wings or moldboards form an integral part of the runner members joints between these parts are obviated, and the wings will scour and prevent earth adhering thereto.

The shoe is adapted to be attached to the drill or planting-machine in any of the usual ways.

In the construction shown in Fig. 4 the runner 1 and wings 3 are separable parts, the runner being a solid piece with its rear portion cleft, as shown at 6, and having the wings or moldboards 3 riveted or bolted thereto by the fastenings 7.

Having thus described the invention, what is claimed as new is—

1. In a grain-drill shoe, a runner provided with a grain-tube having an elbow at its lower or discharge end rearwardly faced, substantially as set forth.

2. In a grain-drill shoe, a runner, a grain-tube applied to the runner, and wings extended from the runner and arranged wholly above the delivery end of the grain-tube, substantially as set forth.

3. In a grain-drill shoe, a runner having its rear portion separated or spread, a grain-tube fitted in the space formed between the separated parts of the runner and having its lower end rearwardly extended, and wings projected rearwardly and upwardly from the runner and located wholly above the delivery end of the grain-tube, substantially as set forth.

4. In a grain-drill shoe, a runner comprising separated parts and integral wings projected upwardly and rearwardly from the separated parts, and a grain-tube fitted in the space between the separated parts of the runner and having its lower end rearwardly extended and located wholly below said wings, substantially as set forth.

In testimony whereof I affix my signature in presence of two witnesses.

HENRY FUNK. [L. S.]

Witnesses:
 JOHN V. METZGER,
 E. F. METZGER.